United States Patent [19]

Wahl

[11] 3,844,577
[45] Oct. 29, 1974

[54] SHOPPING CART
[75] Inventor: Michael Wahl, Searington, L. I., N.Y.
[73] Assignee: Supermarket Equipment Group Inc., Long Island City, N.Y.
[22] Filed: Mar. 21, 1973
[21] Appl. No.: 343,419

[52] U.S. Cl. .................... 280/33.99 R, 280/47.35
[51] Int. Cl. ............................................. B62b 3/02
[58] Field of Search 280/33.99 R, 33.99 S, 33.99 T, 280/33.99 C, 33.99 H, 33.99 F, 47.34, 47.35, 79.1, 79.2

[56] References Cited
UNITED STATES PATENTS
2,898,123 8/1959 Davis et al. ................. 280/33.99 R
3,012,796 12/1961 Mieding .......................... 280/47.34
3,019,953 2/1962 Umanoff .......................... 280/47.35

Primary Examiner—Philip Goodman
Assistant Examiner—John A. Carroll
Attorney, Agent, or Firm—Henry R. Lerner

[57] ABSTRACT

A shopping cart comprising a housing which has an upper compartment for receiving the purchased articles and a lower compartment for receiving trolley means imparting mobility to the housing. The entire housing which defines the upper and lower compartments is made of a one-piece molded plastic member which is removably supportable by the trolley means.

6 Claims, 4 Drawing Figures

PATENTED OCT 29 1974  3,844,577
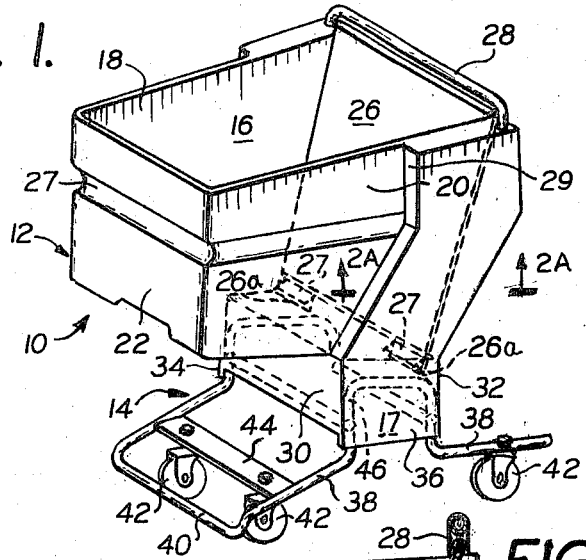
FIG. 1.
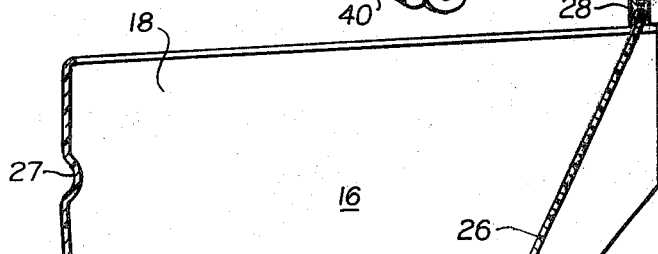
FIG. 2.
FIG. 2A.
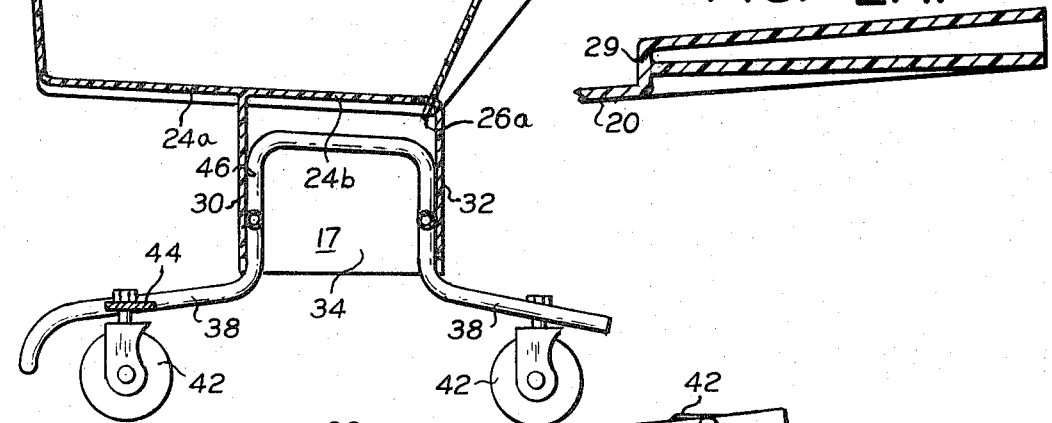
FIG. 3.
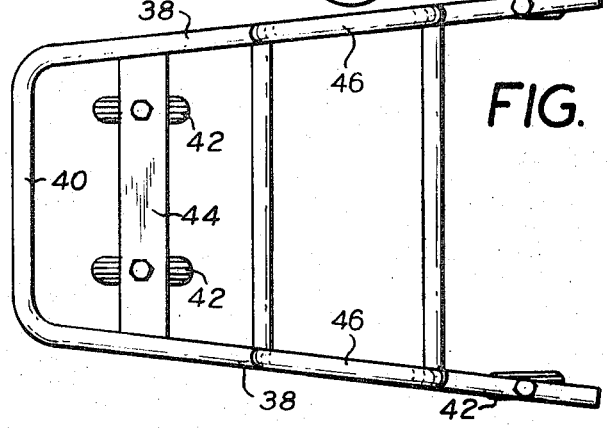

SHOPPING CART

BACKGROUND OF THE INVENTION

The present invention relates to a shopping cart of the type which is commonly used in supermarkets throughout the world.

The overwhelming majority of consumers do most of their shopping in supermarkets by using a shopping cart which is movable by the consumer so that the various items can be selected by the consumer and accumulated in one large group for payment and packaging at the check-out counter.

Shopping carts have been universally made of wire construction which renders such shopping carts relatively expensive. The element of cost is a most significant one because of the extremely high percentage of theft of said shopping carts, as well as a substantial percentage of damaging thereof resulting in unsatisfactory functioning thereof, ultimately requiring replacement.

Notwithstanding the above, the shopping cart is an indispensable requirement for supermarkets so that the annual cost of replacement due to theft and damage is so substantial that it makes a significant dent in the profit margin of the annual operation.

SUMMARY OF THE INVENTION

In accordance with the invention, there is provided a shopping cart made of two separate components, the first component comprising the chamber for receiving the purchased articles and the second component comprising the means for imparting mobility to the first component.

In accordance with the invention, the first component is essentially a one-piece molded plastic housing, designed to provide sufficient strength and rigidity and defining a main upper chamber for receiving the purchased articles and a lower chamber adapted to cooperate with trolley means for imparting movement to the shopping cart. By providing a shopping cart made of said two components, with the first component being a one-piece molded plastic member, the cost thereof is considerably reduced without, however, sacrificing the basic characteristics of the component, namely, that of providing ample room for containing the articles being purchased and that of providing the mobility required therefor.

BRIEF DESCRIPTION OF THE DRAWING

FIG. 1 is an elevational perspective view of the shopping cart in accordance with the invention;

FIG. 2 is a central vertical cross section thereof, on an enlarged scale;

FIG. 2A is a section taken along line 2A—2A of FIG. 1, on an enlarged scale; and FIG. 3 is a top view of the trolley means for the cart.

DESCRIPTION OF THE PREFERRED EMBODIMENT

Referring now to the drawings, reference numeral 10 identifies the shopping cart in accordance with the invention and comprises a main body portion 12 supported by trolley means 14. Main body portion 12 is substantially a one-piece molded component defining an upper chamber 16 and a lower chamber 17. Upper chamber 16 is defined by sidewalls 18 and 20, front wall 22, and a bottom wall constituted by portions 24a and 24b, all of which are part of the integrally one-piece molded main body portion 12. A gate 26 extends between side walls 18 and 20 to define the rear wall of chamber 16, which gate is pivotally mounted between opposite ends of a handle 28. Bottom edge of gate 26 is provided with a pair of tabs 26a which cooperate with slots 27 in bottom wall 24 to define stop means for said gate so that the latter, through gravity, normally defines a rear wall for chamber 16. Lower chamber 17 is defined by bottom wall portion 24b and downwardly extending walls 30, 32, 34 and 36, all of which also form part of the integral one-piece molded main body portion 12. Thus, it is seen that except for handle 28 and pivotally mounted gate 26, all other wall portions are produced in a single one-shot molding operation.

The one-piece molded main body portion 12 is of substantially uniform width throughout, as for example, ¼ inch, thus providing sufficient strength thereto. It will be noted, however, from an examination of FIGS. 1 and 2 in particular that various wall portions are deliberately deformed as at 27 to provide additional reinforcement as well as more desirable aesthetic effects in the shopping cart. Further as shwon in FIG. 2A, the rear portions of side walls 18 and 20 are double walled as at 29 also to impart greater strength to the cart.

The function of lower chamber or cavity 17 is to cooperate with trolley means 14 for the purpose of imparting easy mobility to main body portion 12 and thus define a complete shopping cart which is easily movable in a conventional manner as is done with existing shopping carts.

As best seen in FIGS. 2 and 3, trolley 14 comprises a pair of rail portions 38 joined by transverse rail portion 40. Conventional castors 42 are suitably mounted either directly on the rail portions and/or on the transverse member 44 to impart mobility to trolley 14. Rails 38 are provided with upwardly extending inverted U-shaped portions 46 adapted to be received within lower chamber 17. It will be understood that the relative dimensioning of lower chamber 17 and inverted U-shaped member 46 is preselected to enable convenient assembly of main body portion 12 onto trolley 14 with the latter movably supporting the former. Inverted U-shaped portions 46 can fit within lower cavity 17 with downwardly extending walls 30, 32, 34 and 36 supported by rails 38, as shown, and/or there may be provided means for releasably securing the inverted U-shaped members 46 to the walls of the cavity.

Referring to FIG. 1, it will be noted that the sidewalls 18 and 20 of upper chamber 16 are in slightly converging relation to enable the nesting of one cart within the other, as conventionally done, through the pivotable gate 26. In this connection it will be understood that slots 27 are of sufficient width to enable tabs 26a to clear said slots when gate 26 is pivoted inwardly for nesting purposes.

It is apparent that the shopping cart construction described above is highly economical in construction because of the utilization therein of a one-piece molded plastic construction for the upper main body portion which still performs all the required shopping cart functions. At the same time, the trolley portion which defines the main load supporting element can be made of a suitable metal in order to perform its function satisfactorily. The overall cost of the combination defining the shopping cart in accordance with the invention is clearly substantially lower than conventional shopping carts, thereby substantially reducing the loss factor due to theft. Furthermore, in the event of damage to the upper main body portion, replacement thereof can simply be made without requiring simultaneous replacement of the trolley portion, again contributing to the reduction of the overall replacement cost.

In addition, the utilization of a one-piece molded upper main body portion provides wall portions which, unlike the prior art, do not constitute conventional wire type grill work and thereby impart to such walls additional advantages. For example, the main body walls can be used for carrying informative or promotional material which may be incorporated during the molding thereof, printed directly thereon, or which may be easily secured to such walls, which is not a very realistic possibility in conventional wire type shopping carts.

While there is herein shown and described the preferred embodiment of the invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described my invention what I claim and desire to secure by Letters Patent is:

1. A shopping cart comprising:
   a. a housing having an upper and lower compartment,
   b. said upper compartment having a front wall, a pair of opposite sidewalls and a bottom wall,
   c. said upper compartment bottom wall defining the top wall of said lower compartment, which lower compartment includes a front wall, a rear wall and a pair of sidewalls extending downwardly from said top wall,
   d. said housing being formed of a one-piece integrally molded part,
   e. trolley means, and
   f. cooperating means on said trolley means and said lower compartment for supporting and imparting mobility to said shopping cart.

2. A shopping cart in accordance with claim 1, wherein said cooperating means comprise upwardly extending portions on said trolley means adapted to be received within said lower compartment for movably supporting said housing.

3. A shopping cart in accordance with claim 1, wherein said trolley means are removably securable to said housing.

4. A shopping cart in accordance with claim 1, wherein there is provided a handle having opposite ends supported by said upper compartment sidewalls and a gate pivotally mounted between said handle ends to define a rear wall for said upper compartment.

5. A shopping cart in accordance with claim 4, wherein there is provided cooperating means on said gate and said bottom wall to define a stop for said gate in a position to define said rear wall for said upper compartment.

6. A shopping cart in accordance with claim 5, wherein said last mentioned cooperating means comprise at least one downwardly extending tab on said gate and, at least, one slot in said bottom wall in alignment with said tab, said slot being sufficiently wide to provide clearance for said tab when said gate is pivoted inwardly for nesting purposes.

* * * * *